United States Patent
Roessler

(10) Patent No.: US 9,931,947 B2
(45) Date of Patent: Apr. 3, 2018

(54) CHARGING A CAPACITOR

(71) Applicant: Infineon Technologies AG, Neubiberg (DE)

(72) Inventor: Werner Roessler, Neufahrn (DE)

(73) Assignee: Infineon Technologies AG, Neubiberg (DE)

( * ) Notice: Subject to any disclaimer, the term of this patent is extended or adjusted under 35 U.S.C. 154(b) by 1086 days.

(21) Appl. No.: 14/015,527

(22) Filed: Aug. 30, 2013

(65) Prior Publication Data

US 2015/0061382 A1     Mar. 5, 2015

(51) Int. Cl.
| | |
|---|---|
| B60L 1/00 | (2006.01) |
| B60L 3/00 | (2006.01) |
| H02G 3/00 | (2006.01) |
| B60L 11/18 | (2006.01) |
| B60L 11/00 | (2006.01) |
| B60L 15/00 | (2006.01) |

(52) U.S. Cl.
CPC ......... B60L 11/1803 (2013.01); B60L 11/005 (2013.01); B60L 15/007 (2013.01); *B60L 2270/20* (2013.01); *Y02T 10/645* (2013.01); *Y02T 10/7005* (2013.01); *Y02T 10/7022* (2013.01)

(58) Field of Classification Search
CPC ........... B60L 11/1803; B60L 11/005; Y02T 10/7005; H02M 1/36; H02M 7/5375; H02M 3/158; H02J 7/345
USPC ...................................................... 307/10.1
See application file for complete search history.

(56) References Cited

U.S. PATENT DOCUMENTS

| | | | | |
|---|---|---|---|---|
| 5,563,479 | A * | 10/1996 | Suzuki | B60L 11/18 318/139 |
| 6,396,724 | B1 | 5/2002 | Hirst | |
| 8,513,953 | B2 * | 8/2013 | Myoen | H02H 9/001 180/443 |
| 2004/0119447 | A1 * | 6/2004 | Kato | H02M 1/34 323/222 |
| 2005/0041440 | A1 * | 2/2005 | Natori | H02M 1/34 363/21.01 |
| 2010/0054002 | A1 * | 3/2010 | Lu | H02J 9/062 363/37 |
| 2011/0316489 | A1 * | 12/2011 | Norimatsu | H02M 1/36 320/166 |
| 2012/0235661 | A1 | 9/2012 | Roessler et al. | |

(Continued)

FOREIGN PATENT DOCUMENTS

JP     2010252470 A     11/2010

OTHER PUBLICATIONS

Newnes Dictionary of Electronics.*

(Continued)

*Primary Examiner* — Rexford Barnie
*Assistant Examiner* — Rasem Mourad
(74) *Attorney, Agent, or Firm* — Shumaker & Sieffert, P.A.

(57) ABSTRACT

In one example, a method comprises alternately switching on a first switch connected in series with a capacitor and connected in parallel with a first capacitive element, and a second switch connected in series with the capacitor and connected in parallel with a second capacitive element. Aeries circuit with the first switch, the capacitor and the second switch may be coupled to supply nodes for receiving a supply voltage.

25 Claims, 9 Drawing Sheets

(56) References Cited

U.S. PATENT DOCUMENTS

2012/0306003 A1* 12/2012 Willmeroth ......... H01L 29/0634
　　　　　　　　　　　　　　　　　　　　257/329
2012/0307526 A1* 12/2012 Senanayake .......... H02M 3/158
　　　　　　　　　　　　　　　　　　　　363/16

OTHER PUBLICATIONS

Office Action, in the Chinese language, from counterpart Chinese Application No. 201410429477.1 dated Jul. 28, 2016, 7 pp.
Office Action, in Chinese, from counterpart Chinese Patent Application 201410429477.1, dated Jan. 10, 2018, 9 pp.

* cited by examiner

CHARGING A CAPACITOR

TECHNICAL FIELD

This disclosure relates to power converter circuits, switching circuits and other similar circuits that may include a capacitor.

BACKGROUND

A power converter circuit, such as a power converter circuit (inverter) for driving an electric motor in a car, usually includes an input capacitor that serves to buffer energy received from a power source, such as a battery. Power converter circuits may also be used in many other types of applications.

SUMMARY

A first example relates to a method. The method includes alternately switching on a first switch connected in series with a capacitor and connected in parallel with a first capacitive element, and a second switch connected in series with the capacitor and connected in parallel with a second capacitive element, wherein a series circuit with the first switch, the capacitor and the second switch is coupled to supply nodes for receiving a supply voltage.

A second example relates to a switching circuit. The switching circuit includes an input configured to be connected to a power source, and an output configured to be connected to a capacitor, a first switch connected in parallel with a first capacitive element and connected between the input and the output, a second switch connected in parallel with a second capacitive element and connected between the input and the output, and a control circuit. The control circuit is configured to operate the first switch and the second switch in a pre-charging mode by alternately switching on the first switch and the second switch.

BRIEF DESCRIPTION OF THE DRAWINGS

Examples will now be explained with reference to the drawings. The drawings serve to illustrate some principles, so that only aspects necessary for understanding these principles are illustrated. The drawings are not to scale. In the drawings the same reference characters denote like features.

DETAILED DESCRIPTION

Examples of the present disclosure relate to a method for charging a capacitor, in particular for pre-charging a capacitor in a power converter circuit, and to a switching circuit.

A power converter circuit, such as a power converter circuit (inverter) for driving an electric motor in a car, usually includes an input capacitor that serves to buffer energy received from a power source, such as a battery. This capacitor may have a relatively high capacitance, such as several 100 microfarads (µF). In order to be able to disconnect the power converter circuit from the power source a switching circuit may be provided. In a conventional system, this switching circuit includes at least one first relay. In a normal operation mode, the at least one first relay connects the power source to the power converter circuit. In this operation mode, it is desirable for the first relay to have a low electrical resistance, in order to keep losses low. When the switching circuit is switched on for the first time after the input capacitor has been discharged, a high inrush current can flow from the power source to the input capacitor. In this operation mode it is desirable for the switching circuit to limit the current flowing into the input capacitor to a predefined current level. For this, a second relay may be provided in parallel with the first relay. This second relay may have a higher electrical resistance than the first relay or may have a resistor connected in series thereto. In this type of switching circuit, the second relay is used to precharge the input capacitor, wherein the first relay is switched on after the input capacitor has been pre-charged to a predefined charge level.

In modern electric cars, a low weight and a low size of the drive system is of the essence. Since relays are heavy, space consuming, and are subject to wear there is a need to provide a reliable switching circuit that includes less switching devices, and lighter and smaller switching devices.

In the following detailed description, reference is made to the accompanying drawings. The drawings form a part of the description and by way of illustration show specific examples. It is to be understood that the features of the various examples or embodiments described herein may be combined with each other, unless specifically noted otherwise.

Figure 1:
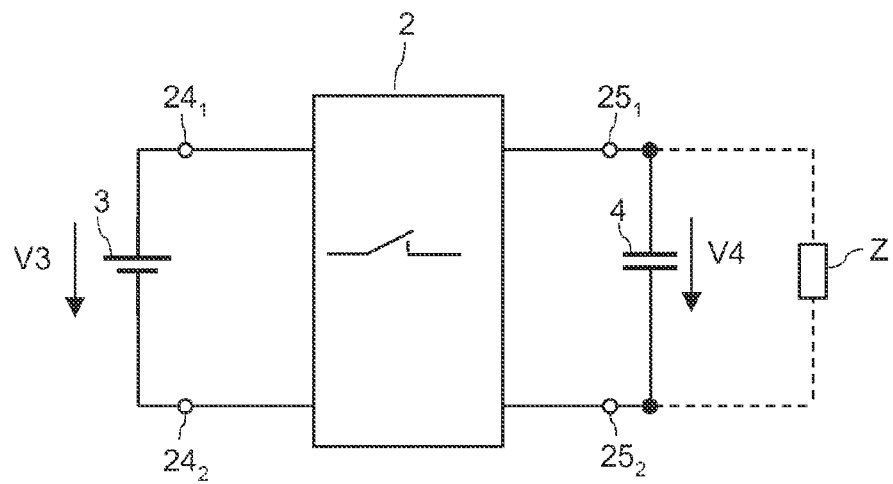
FIG. 1 schematically illustrates an electronic circuit including a switching circuit coupled between a power source and a capacitor.

FIG. 1 schematically illustrates one example of an electronic circuit. The electronic circuit includes a switching circuit 2 with an input $24_1$, $24_2$ coupled to a power source 3, and an output $25_1$, $25_2$ coupled to a capacitor 4. A load Z (illustrated in dashed lines) may be connected to the capacitor 4. The electronic circuit shown in FIG. 1 is, for example, an electronic circuit employed in an electric vehicle or a hybrid vehicle. In this case, the power source 3 may be battery, in particular a rechargeable battery, and the load Z may include a power converter (inverter) and an electric motor driven by the power converter. In this type of application, the capacitor 4 may be an input capacitor of the power converter circuit and may serve to buffer energy received from the power source 3. A voltage level of the supply voltage V3 is, for example, several 100 V, such as about 400 V, and a capacitance of the capacitor 4 is, for example, several 100 microfarads (μF).

According to one example, the switching circuit 2 can be operated in a normal operation mode, and in a pre-charging mode. In the normal operation mode, the switching circuit 2 connects the capacitor 4 and the load Z to the power source 3. In the pre-charging mode, the switching circuit 2 pre-charges the capacitor 4. Pre-charging may become necessary after the capacitor 4 has been (completely) discharged. When the capacitor 4 has been discharged, simply connecting the capacitor 4 to the power source 3 may cause high inrush currents that may damage at least one of the power source, a switch coupling the power source to the capacitor, and the capacitor.

Figure 2:
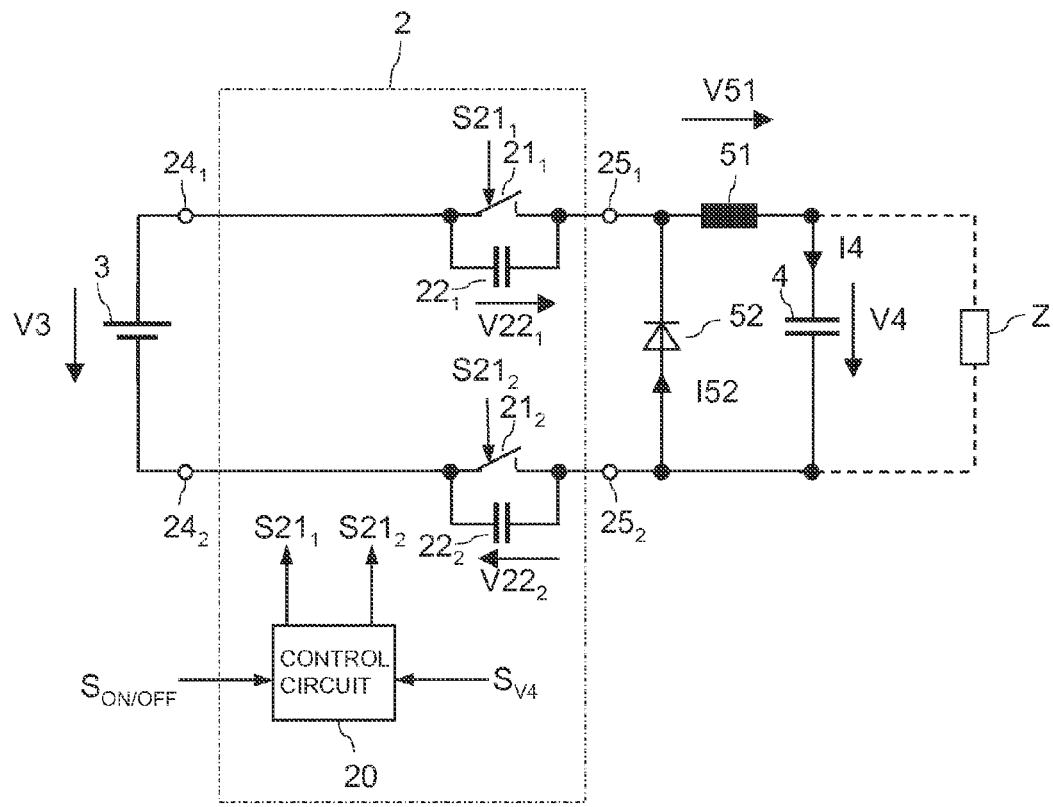
FIG. 2 illustrates one example of the switching circuit.

FIG. 2 shows one example of the switching circuit 2 in greater detail. In this example, the switching circuit 2 includes a first switch $21_1$ coupled between the input $24_1$, $24_2$ and the output $25_1$, $25_2$, and connected in parallel with a first capacitive element $22_1$; and a second switch $21_2$ coupled between the input $24_1$, $24_2$ and the output $25_1$, $25_2$, and connected in parallel with a second capacitive element $22_2$. In the present example, the first switch $21_1$ is coupled between a first input node $24_1$ and a first output node $25_1$, and the second switch $21_2$ is coupled between a second input node $24_2$ and second output node $25_2$. Each of the first switch $21_1$ and the second switch $21_2$ is connected in series with the capacitor 4, and a series circuit with the first switch $21_1$, the capacitor 4, and the second switch $21_2$ is coupled between the first and second input nodes $24_1$, $24_2$.

Referring to FIG. 2, the switching circuit 2 further includes a control circuit 20. The control circuit 20 is configured to drive the first switch $21_1$ and the second switch $21_2$. That is, the control circuit 20 generates a first drive signal $21_1$ received by the first switch $21_1$, and a second drive signal $S21_2$ received by the second switch $21_2$. Each of the first switch $21_1$ and the second switch $21_2$ switches on and off dependent on a signal level of the corresponding drive signal $S21_1$ and $S21_2$, respectively.

The control circuit 20 can operate the switching circuit 2 in a pre-charging mode. In the pre-charging mode, the control circuit 20 alternately switches on the first switch $21_1$ and the second switch $21_2$, so that there are a plurality of subsequent switching cycles, wherein in each switching cycle the first switch $21_1$ is switched on for a first on-period, and, after the first on-period, the second switch $21_2$ is switched on for a second on-period. In a next switching cycle, again the first switch $21_1$ is switched on, and so on. In each of these switching cycles electrical charge is stored in the capacitor 4. This is explained in greater detail below.

Figure 3:
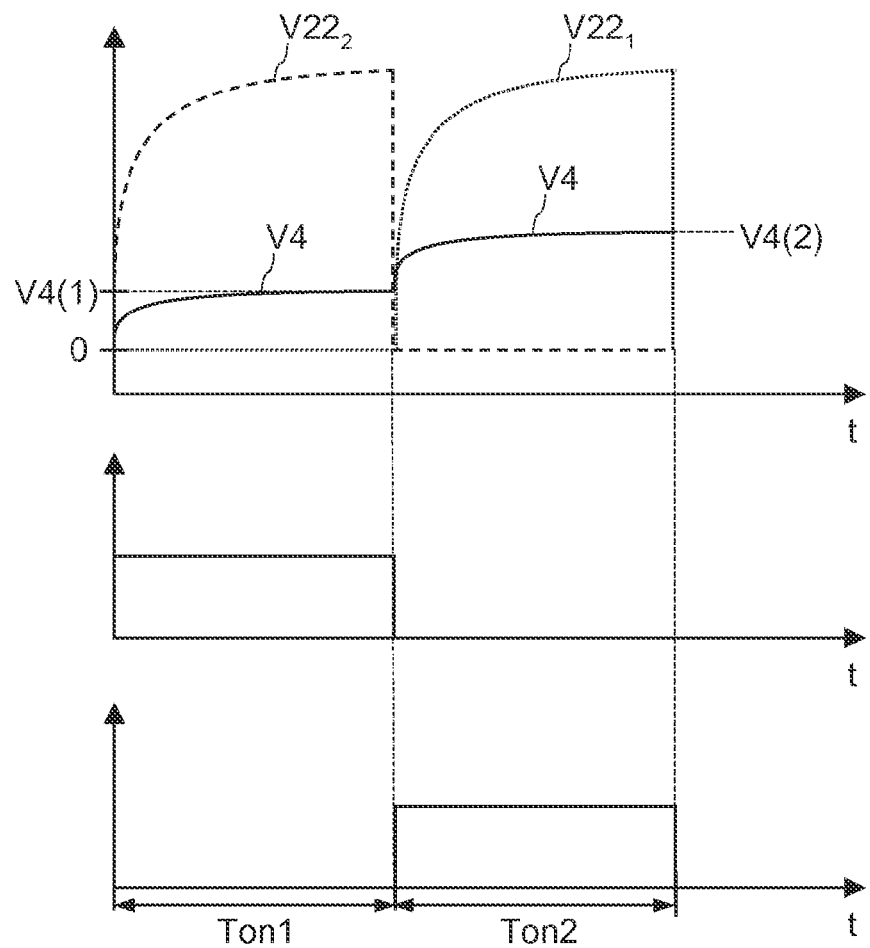
FIG. 3 shows timing diagrams illustrating one way of operation of the switching circuit in one switching cycle.

Operation of the switching circuit 2 in one switching cycle is explained with reference to FIG. 3 below. FIG. 3 schematically illustrates timing diagrams of the first drive signal $S21_1$, the second drive signal $S21_2$, a voltage $V22_1$ across the first capacitive element $22_1$, a voltage $V22_2$ across the second capacitive element $22_2$, and a voltage V4 across the capacitor 4. For the purpose of illustration it is assumed that the capacitor 4 has been completely discharged before the pre-charging process begins. Just for the purpose of explanation, a high level of one of the first and second drive signals $S21_1$, $S21_2$ represents an on-level that switches on the corresponding switch, while a low level represents an off-level that switches off the corresponding switch.

FIG. 3 illustrates timing diagrams in one switching cycle that includes a first on-time Ton1 in which the first switch $21_1$ is switched on, and a second on-time Ton2 in which the second switch $22_2$ is switched on. The first on-time Ton1 and the second on-time Ton2 do not timely overlap. That is, only one of the first switch $21_1$ and the second switch $21_2$ is switched on at one time.

When the first switch $21_1$ is switched on and the second switch $21_2$ is switched off, the capacitor 4 and the second capacitive element $22_2$ form a capacitive voltage divider coupled between the first input node $24_1$ and the second input node $21_2$. Referring to FIG. 3, the voltage V4 across the capacitor 4 and the voltage $V22_2$ across the second capacitive element $22_2$ increase as the first switch $21_1$ switches on. A rate at which these voltages V4, $V22_2$ increase is, inter alia, dependent on an on-resistance of the first switch $21_1$, on line resistances of connection lines electrically connecting the individual components of the electronic circuit, and on discrete or parasitic inductances in the electronic circuit.

Just for the purpose of explanation it is assumed that a capacitance C4 of the capacitor 4, and a capacitance $C22_2$ of the capacitor $22_2$ is substantially constant and substantially independent of the voltage level of a voltage across the corresponding capacitor. However, the way of operation explained with reference to FIG. 3 is not restricted to an electronic circuit in which the individual capacitors have constant capacitances (examples of capacitors with voltage-dependent capacitances are explained with reference to FIGS. 8 to 11 herein below). For the purpose of explanation it is further assumed that the first on-period Ton1 is long enough for the voltage $V4+V22_2$ across the series circuit with the capacitor 4 and the second capacitive element $22_2$ to increase to the supply voltage V3. In this case, at the end of the first on-period Ton1 the voltages V4 and $V22_2$ are as follows:

$$V22_2 = \frac{C4}{C4 + C22_2} \cdot V3 \tag{1a}$$

$$V4 = \frac{C22_2}{C4 + C22_2} \cdot V3 \tag{1b}$$

where C4 is the capacitance of the capacitor 4, and $C22_2$ is the capacitance of the second capacitive element $22_2$.

According to one example, the capacitance C4 of the capacitor 4 is significantly higher than the capacitance $C22_2$ of the second capacitive element $22_2$ ($C4 \gg C22_2$). In this case, the voltage V4 after switching on the first switch $21_1$ for the first time is significantly lower than the voltage $V22_2$. The voltage $V22_1$ across the first capacitive element $22_1$ is substantially zero during the first on-period Ton1, because the first switch $21_1$ substantially short-circuits the first capacitive element $22_1$.

When the second switch $21_2$ switches on at the beginning of the second on-period Ton2 (and the first switch $21_1$ has been switched off) the second capacitive element $22_2$ is discharged, so that the voltage $V22_2$ substantially turns to zero. During the second on-period Ton2 the capacitive element $22_1$ and the capacitor 4 form a capacitive voltage divider coupled between the first input node $24_1$ and the second input node $24_2$. During this second on-period Ton2 the first capacitive element $22_1$ and the capacitor 4 are charged so that a voltage $V22_1$ across the first capacitive element $22_1$, and the voltage V4 across the capacitor 4 increase. Since the first capacitive element $22_1$ has been completely discharged before the second on-period Ton2 the voltage $V22_1$ substantially starts to increase from zero. The voltage V4 across the capacitor 4 starts to increase from the voltage to which the capacitor 4 has been charged in the preceding first on-period Ton1. This voltage will be referred to as V4(1) in the following. For the purpose of explanation it is assumed that the second on-period Ton2 is long enough for a voltage $V4+V22_1$ across the series circuit with the first capacitive element $22_1$ and the capacitor 4 to increase to the input voltage V3. In this case, the voltage $V22_1$ across the first capacitive element $22_1$, and the voltage V4 across the capacitor 4 are given as follows:

$$V22_1 = \frac{C4}{C4+C22_1} \cdot (V3 - V4(1)) \quad (2a)$$

$$V4 = \frac{C22_1}{C4+C22_1} \cdot (V3 - V4(1)) \quad (2b)$$

where V4(1) denotes the voltage across the capacitor 4 at the end of the preceding first on-period Ton1, V3 denotes the input voltage, and $C22_1$ denotes a capacitance of the first capacitive element $22_1$.

The switching cycle explained with reference to FIG. 3 is repeated several times, so that there are a plurality of subsequent switching cycles. In each switching cycle, the first switch $22_1$ is switched on for the first on-Ton1, and the second switch $21_2$ is switched on for the second on-period Ton2. According to one example, the first on-period Ton1 and the second on-period Ton2 in one switching cycle are substantially equal. Further, the first on-period Ton1 can be substantially equal in each of the subsequent switching cycles, and the second on-period Ton2 can be substantially equal in each of the subsequent switching cycles. In each switching cycle, additional charge is stored in the capacitor 4, so that the voltage V4 across the capacitor 4 gradually increases. The first on-period Ton1, and the second on-period Ton2 are, for example, between 10 microseconds (µs) and 70 microseconds, in particular between 30 microseconds and 50 microseconds.

An operation in which either the first switch $21_1$ is switched on for the first on-period Ton1, or the second switch $21_2$ is switched on for the second on-period Ton2 will be referred to as half-cycle in the following. Referring to equations (1b) and (2b) the voltage V4 across the capacitor 4 increases in each half-cycle. An increase of the voltage V4 in each half-cycle is approximately:

$$\Delta V4 = V4(k) - V4(k-1) = \frac{C22}{C4+C22} \cdot (V3 - V4(k-1)) \quad (3)$$

where V4(k) denotes the voltage V4 across the capacitor at the end of one half-cycle (the k-th half-cycle), V4(k-1) denotes the voltage across the capacitor 4 at the end of the preceding half-cycle (the (k-1)-th half-cycle, and C22 denotes the capacitance of the one of the first and second capacitances $22_1$, $22_2$ that is charged in the k-th half-cycle. Referring to equation (3), the increase of the voltage ΔV4 in each half-cycle decreases as the voltage V4 across the capacitor 4 increases.

Figure 4:
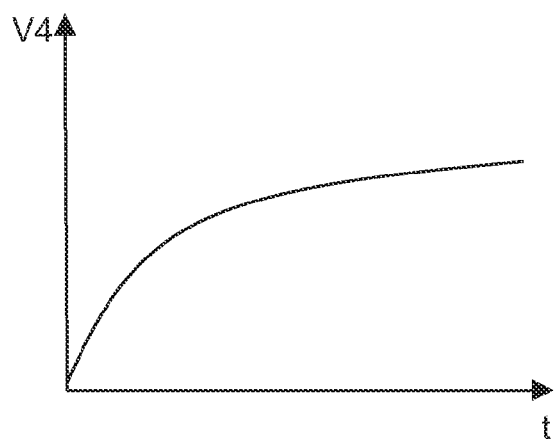
FIG. 4 shows timing diagrams illustrating a voltage across the capacitor in a pre-charging mode.

FIG. 4 schematically illustrates the increase of the voltage V4 over the time t. Referring to FIG. 3, the capacitor voltage V4 increases stepwise in each half-cycle. However, FIG. 4 shows the voltage V4 over a time period that includes a plurality, such as several hundred, several thousand or even several ten thousand, switching cycles, so that a stepwise increase of the voltage V4 is not visible in the diagram shown in FIG. 4. During the pre-charging process, the capacitor 4 can be charged to a voltage that substantially corresponds to the input voltage. The duration of the pre-charging process (the pre-charging time), that is the duration until the capacitor voltage V4 substantially corresponds to the input voltage V3 is dependent on the capacitance C4 of the capacitor, the capacitances $C22_1$, $C22_2$ of the first and second capacitors $22_1$, $22_2$, the duration of the on-periods Ton1, Ton2, and on a voltage level of the input voltage. For example, in an electronic circuit with a capacitor 4 having a capacitance C4 of several 100 microfarads, such as between 500 and 900 microfarads, with first and second capacitors $22_1$, $22_2$ having a capacitance of about 1 microfarads, and which durations of the on-periods Ton1, Ton2 are several 10 microseconds, such as between 30 and 50 microseconds, charging the capacitor voltage V4 to substantially the input voltage V3 may take between several 10 microseconds (µs) and a few 100 microseconds, such as between 50 ms and 200 ms. In general, the pre-charging time increases when first and second capacitors $22_1$, $22_2$ with smaller capacitances are employed. However, in this case the on-periods Ton1, Ton2 can be made shorter which at least partially may help to counteract such an increase of the charging time.

Figure 5:
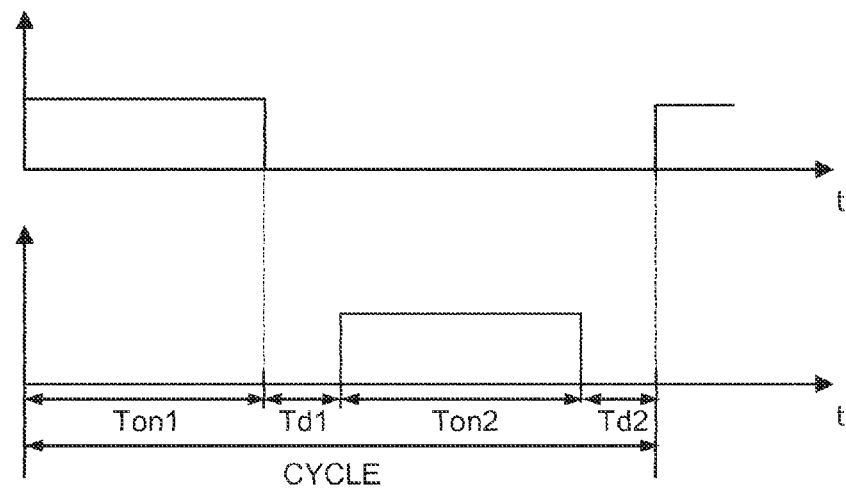
FIG. 5 shows timing diagrams illustrating one way of operation of the switching circuit according to a further example.

FIG. 5 shows timing diagrams of the first and second control signal $S21_1$, $S21_2$ according to a further example. In this example, there is a dead-time Td1 after the first on-period Ton1 and before the second on-period Ton2, and there is a second dead-time Td2 after the second on-period Ton2 and the first on-period in the subsequent switching cycle. During the first dead-time Td1 and the second dead-time Td2 both, the first switch $21_1$ and the second switch $21_2$ are switched off. Providing the dead-times Td1, Td2 helps to make sure that there is no time period in the pre-charging mode in which both switches $21_1$, $21_2$ are conducting, so as to prevent a high inrush current. The dead-times Td1, Td2 are, for example, higher than several 10 nanoseconds to safely avoid both switches $21_1$, $21_2$ from conducting at the same time.

Referring to FIG. 2, the electronic circuit may include an inductor 51 coupled in series with the capacitor 4. The inductor 51 can be a discrete electronic device or can be formed by line inductances of connection lines that connect the individual electronic devices of the electronic circuit, in particular those connection lines that connect the capacitor 4 and the load Z to the switching circuit 2. When, in the pre-charging process, a current flows from the power source 3 through one of the first and second switches $21_1$, $21_2$ to the capacitor 4, energy is magnetically stored in the inductor 51. After the one of the first and second switches $21_1$, $21_2$ has been switched off, a freewheeling element 52 allows a current flow through the inductor 51 to continue, thereby transferring the energy stored in the inductor 51 to the capacitor 4. A current may also flow through the freewheeling element 52 when the one of the first and second switches $21_1$, $21_2$ is on, but the capacitive element ($22_2$ or $22_1$) coupled in series with the capacitor 4 has been completely charged, that is when a voltage across the series circuit with the capacitor 4 and the capacitive element ($22_2$ or $22_1$) has increased to the input voltage. At this time, the inductor 51 drives the capacitor current I4 through the capacitor 4 and the freewheeling element 52. The freewheeling element 52 is connected in parallel with a series circuit that includes the capacitor 4 and the inductor 51.

Referring to the explanation above, the on-periods Ton1, Ton2 can be substantially constant during the pre-charging process. Referring to equation (3) and to the graph shown in FIG. 4, the amount of charge that is stored in the capacitor 4 in one switching cycle, or one half-cycle decreases as the voltage across the capacitor 4 increases. Thus, the time duration in which a current flows into the capacitor decreases as the capacitor voltage V4 increases. According to one example, time durations of the first and second on-periods Ton1, Ton2 are adjusted to decrease as the capacitor voltage V4 increases.

According to a further example, a current I4 into the capacitor 4 is detected after one of the first and second switches $21_1$, $21_2$ has been switched on at the beginning of an on-period Ton1, Ton2, respectively, and the corresponding on-periods ends (that is the one of the first and second switches $21_1$, $21_2$ is switched off) when this current has decreased to zero. Alternatively, a voltage across the one of the first and second switches $21_1$, $21_2$ is detected, and the corresponding on-period ends when this voltage indicates that a current through this switch has become zero.

According to yet another example, a current I52 through the freewheeling element 52 is detected. This detection may be in different ways. According to one example, the one of the first and second switches $21_1$, $21_2$ that is on in one half-cycle is switched off when the freewheeling element 52 starts to conduct a current. In this example, where the current I52 through the freewheeling element 52 serves to define the end of an on-period, the current through the freewheeling element 52 may further be used to adjust the dead time. The dead time may end and the other one of the first and second switches $21_1$, $21_2$ may be switched on when the current I52 through the freewheeling element 52 has decreased to zero. According to a further example, an on-period ends each time the current I52 through the freewheeling element has decreased to zero.

In the electronic circuit shown in FIG. 2, there is an inrush current at the beginning of each half-cycle. However, by virtue of the fact that each of the first and second capacitive elements $22_1$, $22_2$ is significantly smaller than the capacitance of the capacitor 4, this inrush current is significantly smaller than an inrush current that would occur if the capacitor 4 was directly coupled to the first and second input nodes $24_1$, $24_2$. According to one example, the capacitance C4 of the capacitor 4 is one hundred times, one thousand times, or even ten thousand times higher than the capacitance of each of the first and second capacitive elements $22_1$, $22_2$.

According to one example, the control circuit 20 is configured to detect a voltage level of the voltage V4 across the capacitor 4, and to operate the switching circuit 2 in a normal operation mode when this voltage level has reached a predefined threshold level $V4_{TH}$. In the normal operation mode, both the first switch $21_1$ and the second switch $21_2$ are switched on in order to directly couple the capacitor 4 and the load Z to the power source 3. According to one example, the threshold level $V4_{TH}$ is higher than 80%, higher than 90%, or even higher than 95% of the voltage level of the supply voltage V3.

Referring to FIG. 2, the control circuit 20 may receive a voltage measurement signal $S_{V4}$ representing the voltage level of the capacitor voltage V4 in order to detect the voltage level of the capacitor voltage V4. The voltage measurement signal $S_{V4}$ may be obtained by measuring the capacitor voltage V4 using a voltage measurement circuit. This voltage measurement circuit can be implemented in a conventional way and is not illustrated in FIG. 2.

Figure 6:
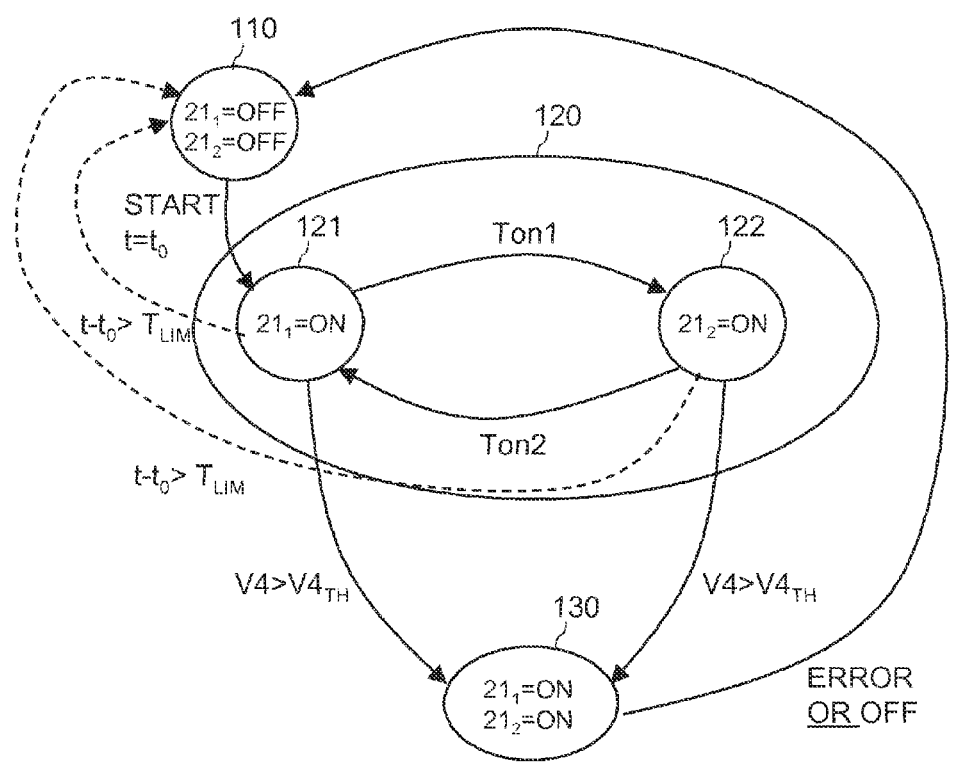
FIG. 6 shows one example of a state diagram of the switching circuit.
Figure 7:
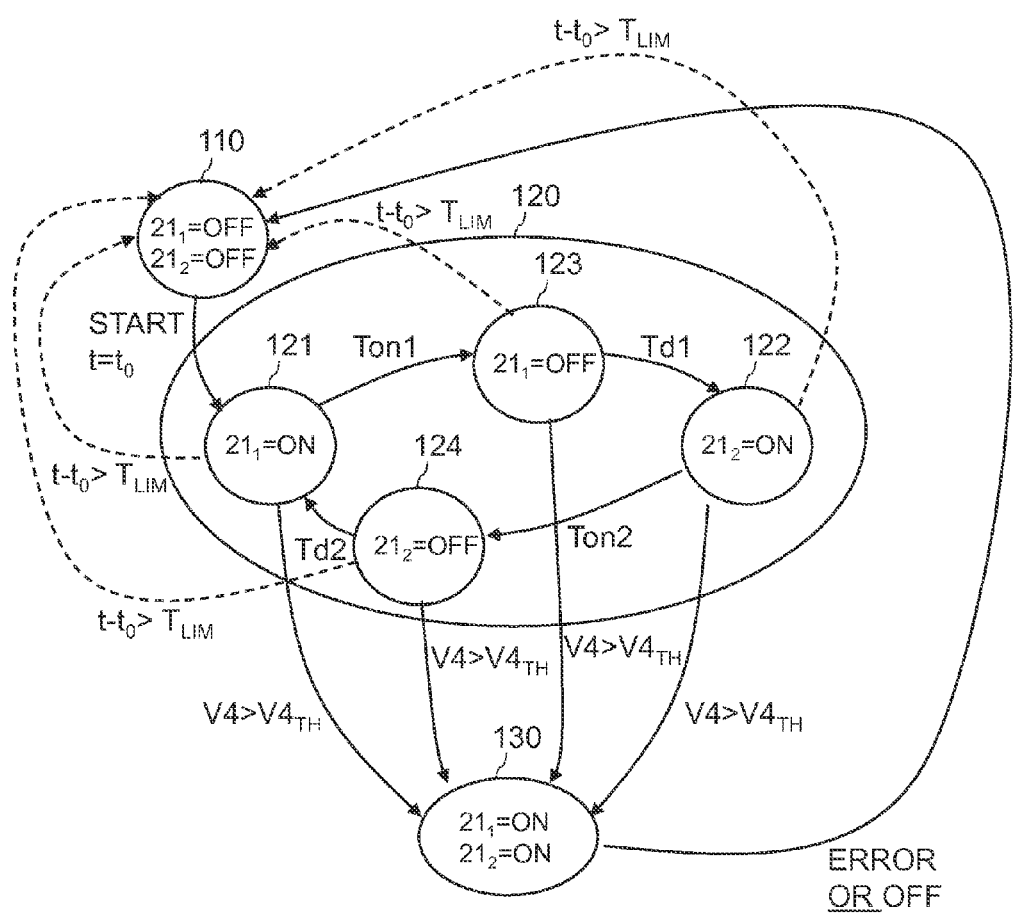
FIG. 7 illustrates a further example of a state diagram of the switching circuit.

FIGS. 6 and 7 show state diagrams illustrating ways of operation of the switching circuit 2 explained herein before. The individual operation states illustrated in FIGS. 6 and 7 are controlled by the control circuit 20. This control circuit may include a programmable signal processing circuit, such as a microcontroller.

Referring to FIG. 6, the switching circuit 2 can assume an off-state 110 in which the first switch $21_1$ and the second switch $21_2$ are switched off. Upon occurrence of a start condition the switching circuit 2 enters a pre-charging state (pre-charging mode) 120 in which the capacitor 4 is pre-charged. According to one example, the control circuit 20 receives an external control signal $S_{ON/OFF}$ (see FIG. 2) that indicates whether or not it is desired to connect the power source to the capacitor 4. According to one example, the start condition is met when a signal level of this signal $S_{ON/OFF}$ indicates that it is desired to couple the capacitor 4 to the power source 3.

In the pre-charging mode the switching circuit 2 alternately changes between a first on-state 121 in which the first switch $21_1$ is switched on and the second switch $21_2$ is switched off, and a second on-state 122 in which the second switch $21_2$ is switched on and the first switch $21_1$ is switched off. According to one example (shown in FIG. 6) the switching circuit 2 is in the first on-state for the on-period Ton1 and then changes to the second on-state 122, and is in the second on-state 122 for the second on-period Ton2 and then changes back to the first on-state 121.

According to a further example, illustrated in FIG. 7, the switching circuit 2 changes from the first on-state 121, after the first on-period Ton1, to a first dead-time state 123 in which both switches $21_1$, $21_2$ are off, changes from the first dead-time state 123, after the first delay time Td1, to the second on-state 122. From the second on-state 122 the switching circuit 2 changes, after the first on-period Ton2, to a second dead-time state 124, and from the second dead-time state 124 the switching circuit 2 changes to the first on-state 121, after the second delay time Td2.

Referring to FIGS. 6 and 7, the switching circuit 2 changes from the pre-charging state 120 to a normal operation state (normal operation mode) 130 when the voltage V4 across the capacitor 4 has reached the threshold level $V4_{TH}$. In the normal operation mode 130 the first switch $21_1$ and the second switch $21_2$ are switched on.

When the capacitor 4 has already been pre-charged before the switching circuit 2 changes from the off-state 110 to the pre-charging state 120, the switching circuit 2 may immediately change to the normal state 130 without going through one switching cycle.

From the normal state 130, the switching circuit 2 may return to the off-state 110 when an error condition occurs or when the control signal $S_{ON/OFF}$ indicates that it is desired to disconnect the capacitor 4 and the load Z from the power source 3.

According to one example, illustrated in dashed lines in FIGS. 6 and 7, the switching circuit 2 changes from, the pre-charging mode 120 back to the off-mode when the capacitor has not been charged to the threshold voltage $V4_{TH}$ within a predefined time period $T_{LIM}$.

The first and second capacitive elements $22_1$, $22_2$ can be implemented as conventional capacitors including a first and a second capacitor electrode and a capacitor dielectric between the first and second capacitor electrodes. Each of the first and second switches $21_1$, $21_2$ can be implemented as an electronic switch, in particular an electronic switch having a normally-off characteristic, such as a normally-off transistor, or a transistor circuit having a normally-off characteristic. A transistor circuit having a normally-off characteristic is, for example, a cascade circuit including a normally-on transistor, such as a JFET (Junction Field-Effect Transistor) and a normally-off transistor, such as an enhancement MOSFET (Metal Oxide Field-Effect Transistor), controlling the normally-on transistor. The transistors can be implemented using a conventional semiconductor material, such as silicon (Si), silicon carbide (SiC), gallium nitride (GaN), gallium arsenide (GaAs).

Figure 8:
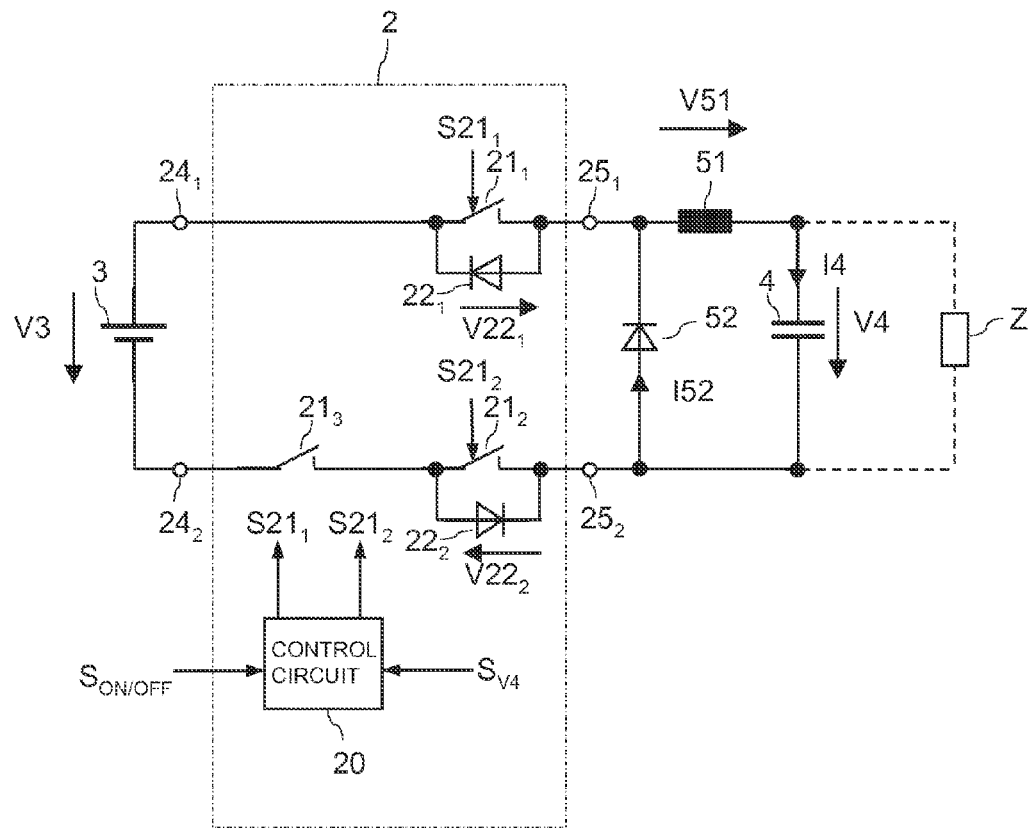
FIG. 8 illustrates a switching circuit including junction capacitors.

According to one example illustrated in FIG. 8, the first and second capacitive elements $22_1$, $22_2$ include a junction capacitor. This junction capacitor is represented by a bipolar diode in the example illustrated in FIG. 8. A junction capacitor is a capacitor that includes a pn-junction, and that is configured to store an electrical charge (in a depletion region or a space charge region) when the pn-junction is reverse biased.

Figure 9:
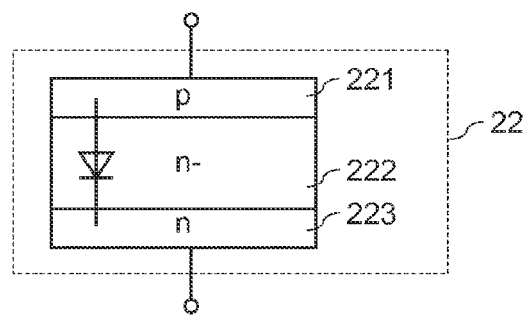
FIG. 9 illustrates one example of a junction capacitor in detail.

FIG. 9 schematically illustrates a vertical cross sectional view of a junction capacitor (bipolar diode). In FIG. 9, reference character 22 represents one of the first and second capacitive elements $22_1$, $22_2$. Referring to FIG. 9, the junction capacitor includes a p-type first emitter region 221, an n-type second emitter region 223, and an n-type or p-type base region 222 between the first and second emitter regions 221, 223. The doping concentration of the base region 222 is lower than doping concentrations of the first and second emitter regions 221, 223. In the example shown in FIG. 9, the base region 222 is an n-type region. In this junction capacitor, a pn-junction is formed between the first emitter region 221 and the base region 222. When a voltage is applied between the first and second emitter regions 221, 223 that reverse biases the pn-junction a space charge region (depletion region) mainly expands in the lower-doped base region 222. The expansion of the space charge region is associated with an ionization of doping atoms in the base region 222, and the first emitter region 221. This ionization of doping atoms is equivalent to storing electrical charge in the junction capacitor (bipolar diode). Referring to FIG. 8, the junction capacitors (bipolar diodes) $22_1$, $22_2$ are connected in series with the capacitor 4 such that the supply voltage V3 reverse biases the first junction capacitor $22_1$ when the second switch $21_2$ is switched on, and such that the supply voltage V3 reverse biases the second junction capacitor $22_2$ when the first switch $21_1$ is switched on. In this example, a cathode of the bipolar diode forming the first junction capacitor $22_1$ is connected to the first input node $24_1$, and an anode of the bipolar diode forming the second junction capacitor $22_2$ is connected to the second input node $24_2$.

Each of the first and second switches $21_1$, $21_2$ and the corresponding first and second capacitive elements $22_1$, $22_2$ can be implemented as separate discrete electronic devices. It is even possible, to implement one switch and the corresponding capacitive element using different technologies. For example, the switch can be implemented using a silicon carbide technology, while the capacitive element can be implemented using a silicon technology.

According to a further example, one switch and the corresponding capacitive elements are integrated in a common semiconductor body and are part of one semiconductor device. According to one example, the switch is implemented as a MOSFET, and the corresponding capacitive element is a junction capacitor formed by a body diode of the MOSFET. This is explained in greater detail with reference to FIG. 11 herein below.

Figure 10:
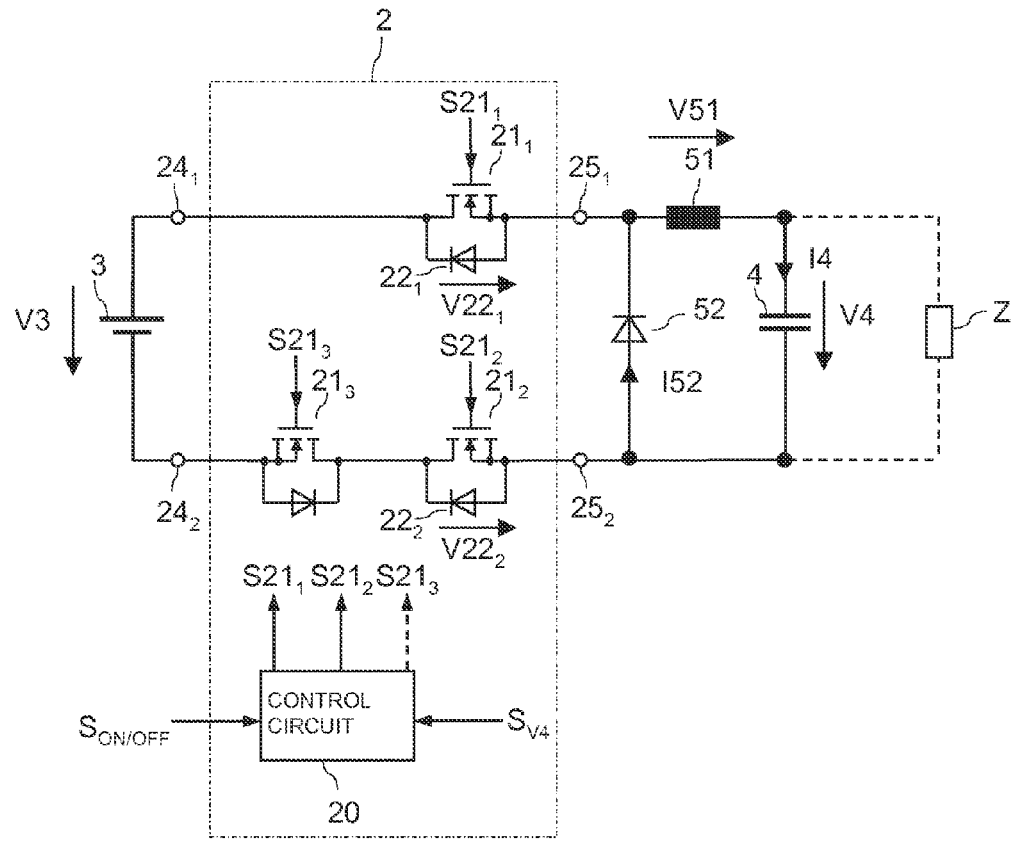
FIG. 10 illustrates one example of a switching circuit including MOSFETs.

FIG. 10 shows the circuit diagram of a switching circuit 2 in which the first and second switches $21_1$, $21_2$ and the corresponding capacitive elements $22_2$ are each implemented as a MOSFET. In the present example, the MOSFET is an n-type enhancement MOSFET. However, this is only an example. Instead of an n-type MOSFET a p-type MOSFET can be used as well. It is even possible, to implement one of the MOSFETs as an n-type MOSFET and to implement the other one of the MOSFETs as a p-type MOSFET.

Although FIG. 10 only shows one MOSFET that is used to implement one of the first and second switches $21_1$, $21_2$, it is also possible to connect several MOSFETs in parallel in order to implement one of the first and second switches $21_1$, $21_2$. Connecting several MOSFETs in parallel reduces the on-resistance of the switch that is implemented by these several MOSFETs. According to one example, one of the first and second switches $21_1$, $21_2$ is implemented by three or more MOSFETs connected in parallel.

A voltage blocking capability of each MOSFET forming one of the first and second switches $21_1$, $21_2$, or forming a part of one of the first and second switches $21_1$, $21_2$ is higher than the maximum supply voltage V3. According to one example, the maximum supply voltage V3 is about 400 V, and the voltage blocking capability of each MOSFETs is about 600 V.

Dependent on the type of load Z connected to the capacitor 4, there can be operation scenarios in which a voltage level of the capacitor voltage V4 increases above the voltage level of the supply voltage V3. For example, there can be operation scenarios in which an electric motor is operated as a generator that supplies energy to the capacitor 4. This energy can be used to recharge the power source 3. A switching circuit 2 implemented with junction capacitors as illustrated in FIGS. 8 and 10 would always allow a current to flow from the capacitor 4 to the power source 3 when the capacitor voltage V4 increases above the battery voltage V3. However, there may be scenarios in which a charging of the battery through the load Z is not desired, for example, when the power source has already been completely charged. Thus, the switching circuit 2 optionally includes a third switch $21_3$ that serves to interrupt a conducting path between the power source 3 and the capacitor 4. Referring to FIG. 10, this third switch $21_3$ can be implemented as a further MOSFET, that has its body diode connected back-to-back with the body diodes of the MOSFETs implementing the first and the second switch $21_1$, $21_2$.

Figure 11:
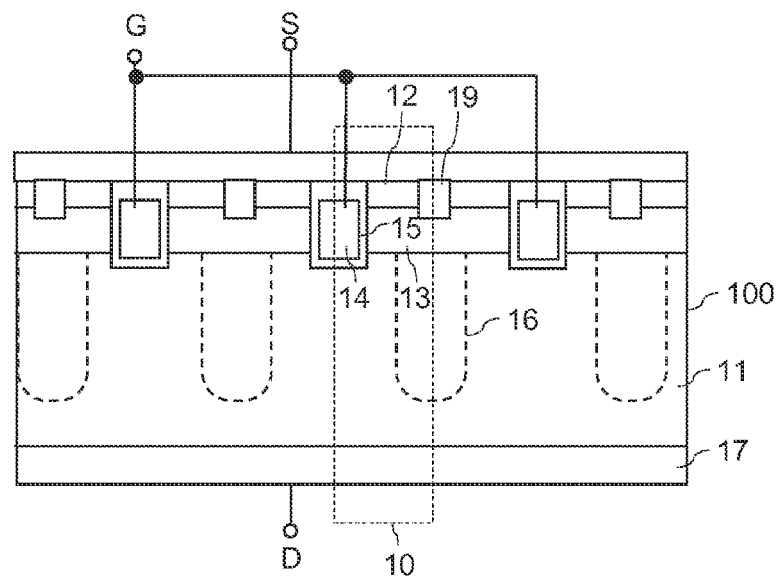
FIG. 11 shows a vertical cross sectional view of a MOSFET according to one example.

FIG. 11 illustrates a vertical cross sectional view of a semiconductor body 100 in which one of the first and the second switches $21_1$, $21_2$ is integrated. The switch 21 (wherein the switch 21 represents one if the first and the second switches $21_1$, $21_2$) is implemented as a MOSFET and includes a drift region 11, a source region 12, a body region 13 between the drift region 11 and the source region 12, and a drain region 17. The drift region 11 is arranged between the body region 13 and the drain region 17. The MOSFET further includes a gate electrode 14 adjacent the body region 13 and dielectrically insulated from the body region 13 by a gate dielectric 15. The drain region 14 is coupled to a drain terminal D, the source region 12 and the body region 13 are coupled to a source terminal S, and the gate electrode 14 is coupled to a gate terminal G. In the example shown in FIG. 11, a source electrode 18 is electrically connected to the source region 12 and the body region 13, wherein a contact region 19 of the same doping type as the body region 13, but more highly doped, connects the source electrode 18 to the body region 13. The source electrode 18 is connected to the source terminal S. A connection between the gate electrode 14 and the gate terminal G is schematically illustrated in FIG. 11.

Referring to FIG. 11, the MOSFET may include a plurality of transistor cells 10, where each transistor cell 10 includes a source region 12, a body region 13, a gate electrode 14 and a gate dielectric 15. The individual transistor cells may have the drift region 11 and the drain region 17 in common. The individual transistor cells 10 are connected in parallel by having the source region 12 and the body region 13 coupled to the source terminal S, and by having the gate electrodes 14 coupled to the gate terminal G.

The MOSFET can be implemented as an n-type MOSFET or a p-type MOSFET. In an n-type MOSFET, the source region 12, the drift region 11 and the drain region 17 are n-doped, while the body region 13 is p-doped. In a p-type MOSFET, the source region 13, the drift region 11, and the drain region 17 are p-doped, while the body region 13 is n-doped. The MOSFETs can be switched on and of by applying a suitable drive potential to the gate terminal G. In an on-state of the MOSFET, the gate electrode 14 generates a conducting channel (an inversion channel) along the gate dielectric 15 between the source region 12 and the drift region 11. The MOSFET further includes a body diode. This body diode is formed by the body region 13, the drift region 11 and the drain region 17, wherein a pn-junction of this body diode is formed between the body region 13 and the drift region 11. When the MOSFET is in an on-state, the conducting channel along the gate dielectric 15 bypasses the pn-junction, so that the body diode is not active in this operation state. When, however, the MOSFET is switched of, so that there is no conducting channel along the gate dielectric 14 between the source region 12 and the drift region 11, the body diode can be reversed biased, thereby acting as junction capacitor. In a n-type MOSFET, the body diode is reversed bias when a positive voltage is applied between the drain terminal D and the source terminal S, and in a p-type MOSFET, the body diode is reversed biased when a positive voltage is applied between the source terminal S and the drain terminal D.

Optionally, the MOSFET (each transistor cell 10 of the MOSFET) includes a compensation region 16 of a doping type complementary to the type of the drift region 11, and extending in the drift region 11 in a direction of the drain region 17. According to one example, each compensation region 16 is coupled to one body region 13. The compensation regions 16, in a conventional way, help to increase the voltage blocking capability of the MOSFET at a given on-resistance of the MOSFET. The compensation regions 16 further result in a large pn-junction between the drift region 11 and the body region 13, so that the body diode of a MOSFET with compensation regions 16 (which is known as a superjunction MOSFET) is capable of storing a higher amount of electrical charge then a MOSFET without compensation region. According to one example, an overall dopant charge in the compensation regions substantially corresponds to an overall dopant charge in the drift region 11.

Figure 12:
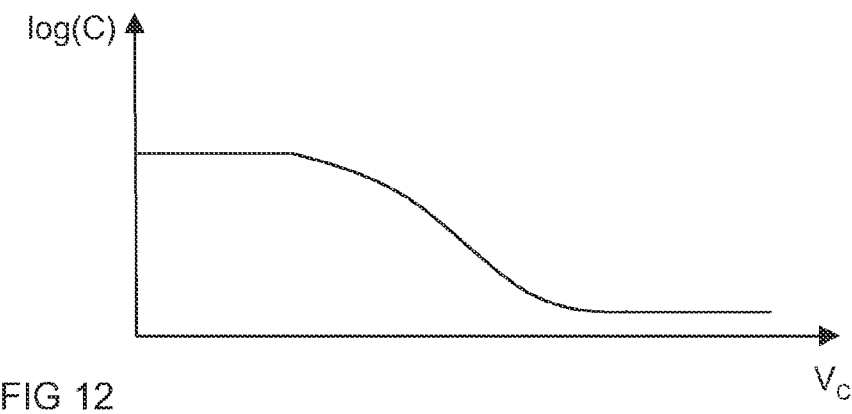
FIG. 12 schematically illustrates a capacitance of a junction capacitor dependent on a voltage across the junction capacitor.

The capacitance of a junction capacitor, such as a bipolar diode shown in FIG. 8, or a body diode of a MOSFET shown in FIG. 10, is dependent on a voltage that reverse biases pn-junction of the junction capacitor, wherein the capacitance decreases as the reverse biasing voltage increases. FIG. 12 schematically illustrates on a logarithmic scale the capacitance of a junction capacitor dependent on a voltage $V_C$ that reverse biases a pn-junction of the junction capacitor. Referring to FIG. 12, the capacitance is relatively high at a low voltage $V_C$ and decreases as the voltage V increases. With other words, the capacitance C decreases as the depletion region expands further in the junction capacitor.

In the electronic circuit explained herein before, the use of a junction capacitor is beneficial in terms of operation losses during the pre-charging mode. This is explained in the following. While the capacitor 4 is gradually charged in the pre-charging mode, the first and second capacitive elements $22_1$, $22_2$ are discharged in each switching cycle. The energy required to charge the first and second capacitive elements $22_1$, $22_2$ is dependent on the current that flows into the corresponding capacitive element $22_1$, $22_2$ and is dependent on the voltage across the capacitive element $22_1$, $22_2$. In a capacitive element that has a high capacitance at a low voltage, a relatively high current may flow when the voltage is low, while the current may decrease as the voltage increases. Thus, a relatively high amount of electrical charge can be stored in the corresponding capacitive element $22_1$, $22_2$ (a corresponding amount of electrical charge is stored in the capacitor 4) requiring a relatively low amount of energy. The maximum capacitance of a superjunction MOSFET with a voltage blocking capability of 600V and an on-resistance of 19 milliohms (mΩ) is, for example, between 100 and several 100 nanofarads (nF).

Figure 13:
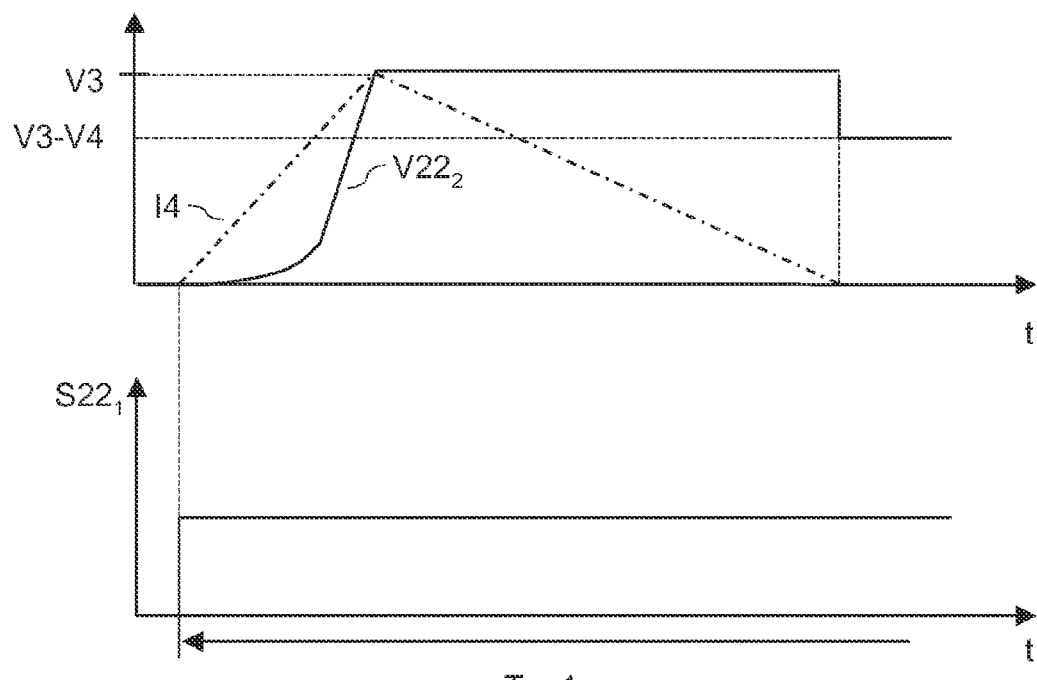
FIG. 13 shows timing diagrams illustrating a current into and a voltage across the capacitor in an electronic circuit including a junction capacitor.

FIG. 13 schematically illustrates the voltage $V22_2$ across one of the first and second capacitive elements (the second capacitive element $22_2$ in this example) at the beginning of one half-cycle in a switching circuit 2 in which first and second capacitive elements $22_1$, $22_2$ implemented as junction capacitors having a non-linear capacitance are employed, FIG. 13 further shows the control signal $S22_1$ of the switch (the first switch $22_1$ in this example) that is switched on in this half-cycle Referring to FIG. 13, the capacitor current I4 increases substantially linearly at the beginning of the half-cycle. This substantially linear increase of the capacitor current I4 is caused by the (parasitic) inductor 51. Although the current I4 increases substantially linearly, the voltage $V22_2$ does not increase linearly, but increases slowly at the beginning and then increases rapidly. This is by virtue of the non-linear capacitance of the capacitive element $22_2$. As the voltage $V22_2$ across the capacitive element $22_2$ reaches a maximum level, the current through the first switch $21_1$ becomes zero and the capacitor current I4 corresponds to a current through the inductor 51 and the freewheeling element 52. The maximum level of the voltage $V22_2$ substantially corresponds to the input voltage V3 (when a forward voltage across the freewheeling element is neglected). In this freewheeling phase, the capacitor current I4 increases, and a magnitude of a voltage V51 across the inductor 51 substantially corresponds to the capacitor voltage V4, wherein these voltages have opposite signs, so that V51≈−V4. The capacitor current I4 decreases to zero when the inductor 51 has been demagnetized. At this time, the voltage V51 across the inductor 51 becomes zero, the freewheeling element 52 is reverse biased, and the voltage $V22_2$ across the capacitive element $22_2$ decreases to V3-V4. Oscillations of the voltage $V22_2$ may occur when the voltage level decreases to V3-V4. However, those oscillations that may result from parasitic inductances and capacitances, are not shown in FIG. 13.

Referring to the explanation provided herein before, the on-period Ton1 may end at the time when the capacitor current I4 starts to flow through the freewheeling element, which is when the voltage $V22_2$ reaches the maximum level.

Alternatively, the on-period Ton1 may end when the current through the freewheeling element has decreased to zero. However, it is also possible to adjust the on-period Ton1 to have a fixed time duration, or a time duration that increases as the capacitor voltage V4 increases.

Figure 14:
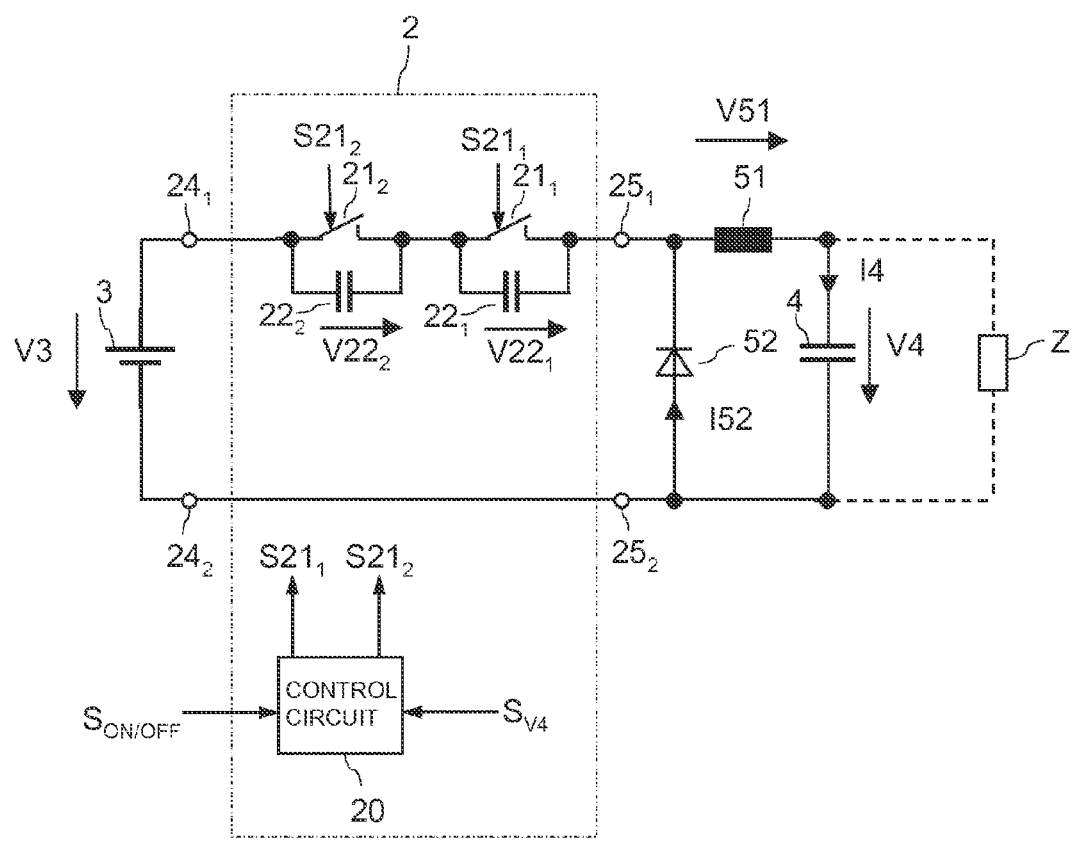
FIG. 14 shows a switching circuit according to a further example.

FIG. 14 illustrates another example of the electronic circuit. In this example, the first and second switches are connected in series between one of the input nodes, such as the first input node $24_1$, and one of the output nodes, such as the first output node $25_1$, of the switching circuit. Like in the examples explained herein before, the first and second switches $21_1$, $21_2$ support a charging of the capacitor 4 in the pre-charging mode, and also contribute to a high safety level of the switching circuit 2. Each of these switches $21_1$, $21_2$ has a voltage blocking capability that at least corresponds to a maximum voltage level of the input voltage V3. Thus, when it is desired to disconnect the power source 3 from the capacitor 4, and the load Z, and when of these switches $21_1$, $21_2$ fails, the other switch is capable of safely disconnecting the power source 3 from the capacitor 4 and the load Z.

Figure 15:
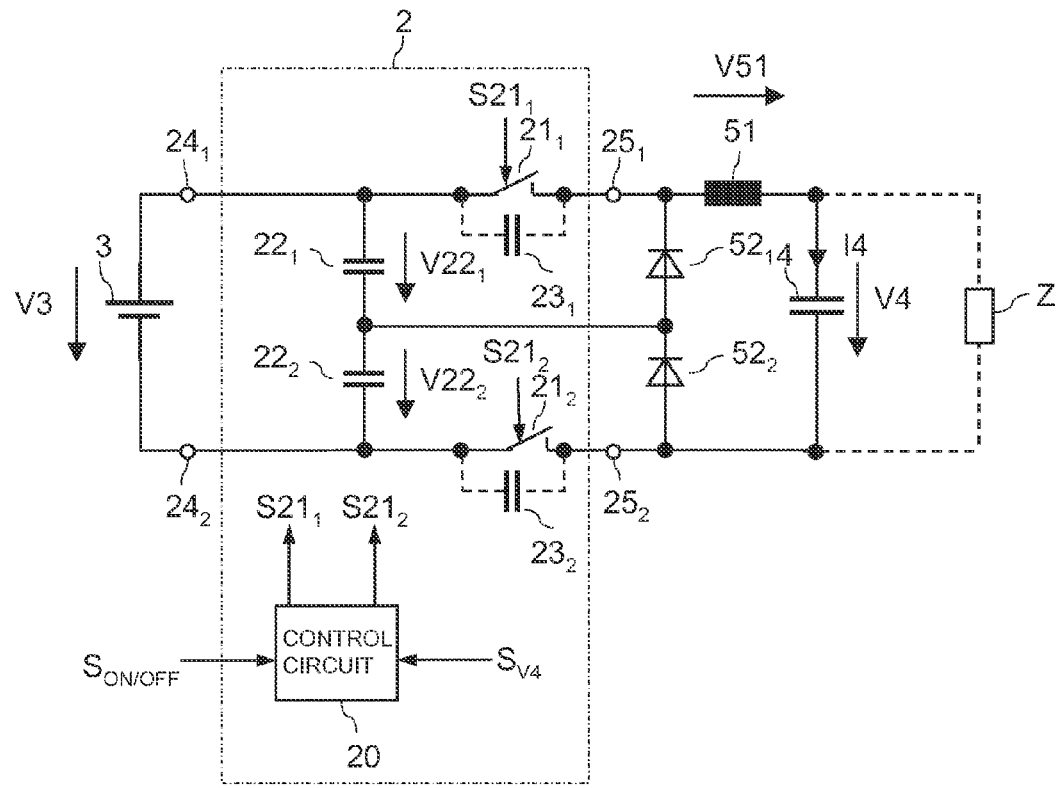
FIG. 15 shows a switching circuit according to a further example.
Figure 16:
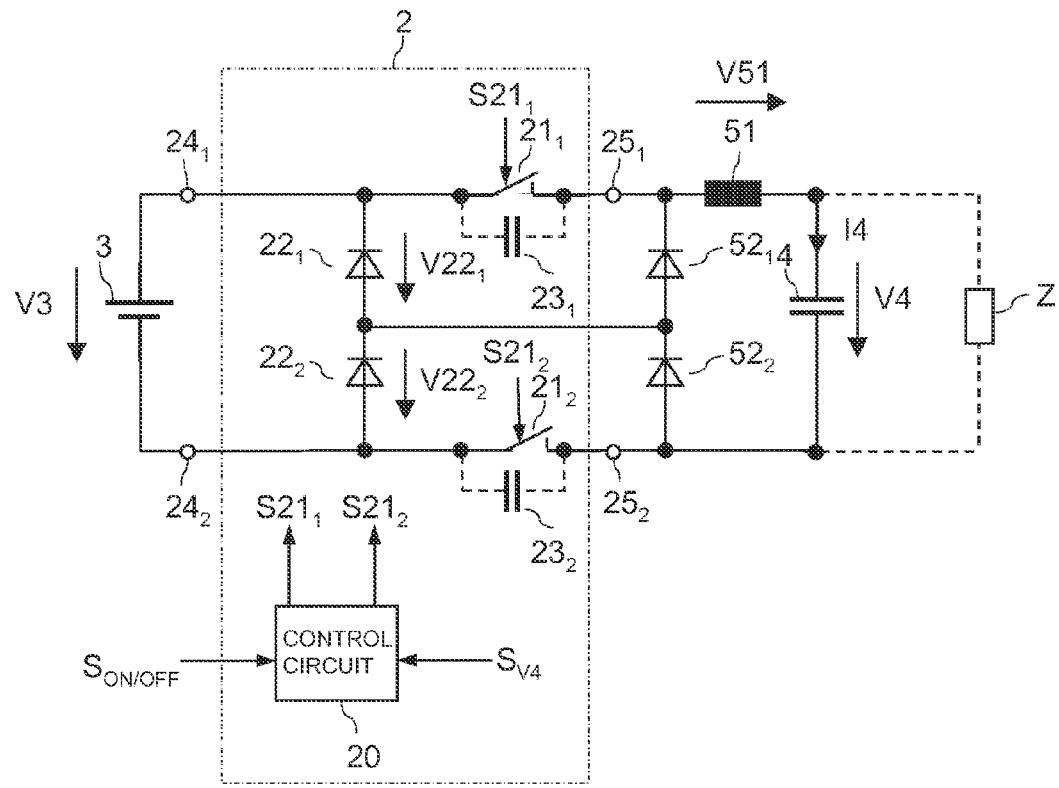
FIG. 16 shows a switching circuit according to yet another example.

FIGS. 15 and 16 illustrates a further example of the switching circuit 2. In this example, a first rectifier element $52_1$, such as a diode, is connected in series with the first capacitive element $22_1$, and a series circuit with the first capacitive element $22_1$ and the first rectifier element $52_1$ is connected in parallel with the first switch $21_1$. Further, a second rectifier element $52_2$, such as a diode, is connected in series with the second capacitive element $22_2$, and a series circuit with the second capacitive element $22_2$ and the second rectifier element $52_2$ is connected in parallel with the second switch $21_2$. The first and second switch $21_1$, $21_2$, the first and second capacitive elements $22_1$, $22_2$, and the first and second rectifier elements $52_1$, $52_2$ are connected such that the second capacitive element $22_2$ can be charged through the second rectifier element $52_2$ in a half-cycle in which the second switch $21_2$ is off and the first switch $21_1$ is on, and can be discharged through the first rectifier element $52_1$ in a subsequent half-cycle in which the second switch $21_2$ is on and the first switch $21_1$ is off. Further, the first and second switch $21_1$, $21_2$, the first and second capacitive elements $22_1$, $22_2$, and the first and second rectifier elements $52_1$, $52_2$ are connected such that the first capacitive element $22_1$ can be charged through the first rectifier element $52_1$ in a half-cycle in which the first switch $21_1$ is off and the second switch $21_2$ is on, and can be discharged through the second rectifier element $52_2$ in a subsequent half-cycle in which the first switch $21_1$ is on and the second switch $21_2$ is off. For this, in the example shown in FIG. 15, the first capacitive element $22_1$ is coupled to one of output nodes, such as the second output node $25_2$, through the second rectifier element $52_2$, and the second capacitive element $22_2$ is coupled to the other one of the output nodes, such as the first output node $25_1$, through the first rectifier element $52_2$. Further, a series circuit with the first and second capacitive element $22_1$, $22_2$ is coupled between the input nodes $24_1$, $24_2$, and a series circuit with the first and second rectifier elements $52_1$, $52_2$ is connected in parallel with a series circuit including the inductor 51 and the capacitor 4. Thus, the series circuit with the first and second rectifier elements $52_1$, $52_2$ acts as a freewheeling element (freewheeling circuit) that takes over the capacitor current I4 driven by the inductor 51 when one of the first and second capacitive elements has been charged to the supply voltage V3.

The first and second capacitive elements can be implemented as capacitors with a capacitor dielectric (see FIG. 15). However, referring to FIG. 16 it is also possible to implement these capacitors as junction capacitors. The first and second switch $21_1$, $21_2$ can be implemented in accordance with one of the examples explained before. According to one example, at least one of the first and second switches $21_1$, $21_2$ includes a MOSFET, such as a superjunction MOSFET. However, none of the first and second capacitive elements $22_1$, $22_2$ shown in FIG. 15 is a body diode of this MOSFET. This body diode (not shown in FIG. 15) are coupled in parallel with one of the series circuits including one of the first and second capacitive elements $22_1$, $22_2$, and one of the first and second rectifier elements $52_1$, $52_2$.

One way of operation of the electronic circuits shown in FIGS. 15 and 16 in the pre-charging mode is explained in the following. In a first half-cycle in which the first switch $21_1$ is switched on and the second switch $21_2$ is switched off, a series circuit with the first switch $21_1$, the capacitor 4, the second rectifier element $52_2$, and the second capacitive element $22_2$ is coupled between the input nodes $24_1$, $24_2$ so that a current flows from the power source 3, through the first switch $21_1$, the capacitor 4, the second rectifier element $52_2$, and the second capacitive element $22_2$. In this way, the capacitor 4 and the second capacitive element $22_1$ form a capacitive voltage divider and are charged in the same way as explained with reference to FIG. 2. In this first half-cycle, the first capacitive element is discharged (at the beginning of the pre-charging phase the first and second capacitive elements $22_1$, $22_2$ are charged through the power source 3, wherein $V22_1$ substantially equals $V22_2$ when the capacitances of these capacitive elements $22_1$, $22_2$ are substantially equal) as the second capacitive element $22_2$ is charged so that a voltage $V22_1+V22_2$ across the series circuit with the first and second capacitive elements $22_1$, $22_2$ equals the supply voltage V3.

In a subsequent second half-cycle in which the second switch $21_2$ is switched on and the first switch $21_1$ is switched off, a series circuit with the second switch $21_2$, the capacitor 4, the first rectifier element $52_1$, and the first capacitive element $22_1$ is coupled between the input nodes $24_1$, $24_2$ so that a current flows from the power source 3, through the first capacitive element $22_1$, the first rectifier element $52_1$, the capacitor 4, and the second switch $21_2$. In this way, the capacitor 4 and the first capacitive element $22_1$ form a capacitive voltage divider and are charged in the same way as explained with reference to FIG. 2. In this second half-cycle, the second capacitive element $22_2$ is discharged as the first capacitive element $22_1$ is charged so that a voltage $V22_1+V22_2$ across the series circuit with the first and second capacitive elements $22_1$, $22_2$ equals the supply voltage V3. In this example the first and second capacitive elements $22_1$, $22_2$ are discharged into the capacitor 4 (or the power source 3), so that this switching circuit can be operated at low losses.

Additionally to the first and second capacitive elements $22_1$, $22_2$ shown in FIGS. 15 and 16 the switching circuit may include a third capacitive element $23_1$ directly coupled in parallel with the first switch $21_1$ (in the same way as the first capacitive element $22_1$ shown in FIG. 2), and a fourth capacitive element $23_2$ directly coupled in parallel with the second switch $21_2$ (in the same way as the second capacitive element $22_2$ shown in FIG. 2). The fourth capacitive element $23_2$ is connected in parallel with the second capacitive element $22_2$ when the first switch $21_1$ is on and the second switch $21_2$ is off, and the third capacitive element $23_1$ is connected in parallel with the first capacitive element $22_1$ when the second switch $21_2$ is on and the first switch $21_1$ is off. The function of the third capacitive element $23_1$ corresponds to the function of the first capacitive element shown in FIG. 2, and the function of the fourth capacitive element $23_2$ corresponds to the function of the second capacitive element shown in FIG. 2.

Except for the example in which the switch $21_1$, $21_2$ and the corresponding capacitive element $22_1$, $22_2$ are formed by a MOSFET with a body diode, it is even possible to implement each of the first and second switch $21_1$, $21_2$ as a relay.

Although the rectifier elements 52, $52_1$, $52_2$ are shown as bipolar diodes in the examples explained herein before, other types of rectifier elements such as Schottky diodes, or diode-connected transistors may be used as well.

In the description hereinbefore, directional terminology, such as "top," "bottom," "front," "back," "leading," "trailing" etc., is used with reference to the orientation of the figures being described. Because components of examples can be positioned in a number of different orientations, the directional terminology is used for purposes of illustration and is in no way limiting. It is to be understood that other examples may be utilized and structural or logical changes may be made without departing from the scope of this disclosure. The following detailed description, therefore, is not to be taken in a limiting sense, and the scope of this disclosure is defined by the appended claims.

Although various exemplary examples have been disclosed, it will be apparent to those skilled in the art that various changes and modifications can be made which will achieve some of the advantages of this disclosure without departing from the spirit and scope of the disclosure. Other components performing the same functions as those described herein may be suitably substituted. It should be mentioned that features explained with reference to a specific figure may be combined with features of other figures, even in those cases in which this has not explicitly been mentioned. Further, the methods of this disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present disclosure is not limited by the foregoing description, nor is it limited by the accompanying drawings. Instead, the scope of this disclosure is limited only by the following claims and their legal equivalents.

It is to be understood that the features of the various examples described herein may be combined with each other, unless specifically noted otherwise.

What is claimed is:

1. A method, comprising:
    alternately switching on a first switch and a second switch,
    wherein a capacitor and a first capacitive element form a first capacitive voltage divider coupled between a first supply node and a second supply node when the first switch has been switched off and the second switch has been switched on,
    wherein the capacitor and a second capacitive element form a second capacitive voltage divider coupled between the first supply node and the second supply node when the first switch has been switched on and the second switch has been switched off,
    wherein a power source is coupled between the first supply node and the second supply node, and
    wherein the alternately switching on the first switch and the second switch pre-charges the capacitor to reduce an inrush current; and
    detecting a voltage level of a voltage across the capacitor and switching on the first switch and the second switch when the voltage level has reached a predefined level.

2. The method of claim 1, wherein alternately switching on the first switch and the second switch comprise switching on only one of the first switch and the second switch at one time.

3. The method of claim 1,
    wherein alternately switching on the first switch and the second switch comprises a plurality of timely subsequent switching cycles,
    wherein each of the plurality of switching cycles comprises:
    switching on the first switch for a first on-period, and, after the first on-period, switching on the second switch for a second on-period.

4. The method of claim 3, wherein the first on-period and the second on-period are substantially equal.

5. The method of claim 3, wherein the first on-period and the second on-period are substantially fixed time periods.

6. The method of claim 3, wherein each of the plurality of switching cycles further comprises:
    a first dead time after the first on-period and before the second on-period, and a second dead time after the second on-period and before the first on-period of a subsequent switching cycle.

7. The method of claim 1, wherein the predefined level is higher than 80% of a voltage level of the supply voltage.

8. The method of claim 1, wherein an inductor is connected in series with the capacitor.

9. The method of claim 8, wherein at least one rectifier element is connected in parallel with a series circuit comprising the capacitor and the inductor.

10. The method of claim 1, wherein at least one of the first capacitive element and the second capacitive element comprises a junction capacitor.

11. The method of claim 10, wherein at least one of the first switch and the second switch comprises a MOSFET, wherein the junction capacitor is formed by a body region and a drift region of the MOSFET.

12. The method of claim 1,
    wherein a first rectifier element is connected in series with the first capacitive element, and a series circuit with the first rectifier element and the first capacitive element is coupled in parallel with the first switch, and
    wherein a second rectifier element is connected in series with the second capacitive element, and a series circuit with the second rectifier element and the second capacitive element is coupled in parallel with the second switch.

13. The method of claim 12,
wherein the first capacitive element is coupled to the capacitor through the second rectifier element, and
wherein the second capacitive element is coupled to the capacitor through the first rectifier element.

14. An electronic circuit comprising:
an input configured to be connected to a power source, the input comprising a first supply node and a second supply node,
an output configured to be connected to a capacitor,
a first switch connected between the input and the output,
a second switch connected between the input and the output, and
a control circuit configured to:
alternately switch on the first switch and the second switch,
wherein the alternately switching on the first switch and the second switch pre-charges the capacitor to reduce an inrush current,
wherein the capacitor and a first capacitive element form a first capacitive voltage divider coupled between the first supply node and the second supply node when the first switch has been switched off and the second switch has been switched on,
wherein the capacitor and a second capacitive element form a second capacitive voltage divider coupled between the first supply node and the second supply node when the first switch has been switched on and the second switch has been switched off, and
wherein the power source is coupled between the first supply node and the second supply node; and
detect a voltage level of a voltage at the output and to switch on the first switch and the second switch when the voltage level has reached a predefined level.

15. The electronic circuit of claim 14, wherein, to alternately switch on the first switch and the second switch, the control circuit, is configured to switch on only one of the first switch and the second switch at one time.

16. The electronic circuit of claim 14,
wherein the control circuit is configured to drive the first switch and the second switch in a plurality of timely subsequent drive cycles, and
wherein the control circuit, in each drive cycle, is configured to switch on the first switch for a first on-period, and, after the first on-period, to switch on the second switch for a second on-period.

17. The electronic circuit of claim 16, wherein the first on-period and the second on-period are substantially equal.

18. The electronic circuit of claim 16, wherein the first on-period and the second on-period are substantially fixed time periods.

19. The electronic circuit of claim 16, wherein the control circuit, in each drive cycle, is further configured to generate a first dead time after the first on-period and before the second on-period, and a second dead time after the second on-period and before the first on-period of a subsequent switching cycle.

20. The electronic circuit of claim 14, wherein the predefined level is higher than 80% of a voltage level at the input.

21. The electronic circuit of claim 14, wherein at least one of the first capacitive element and the second capacitive element comprises a junction capacitor.

22. The electronic circuit of claim 21, wherein at least one of the first switch and the second switch comprises a MOSFET, wherein the junction capacitor is formed by a body region and a drift region of the MOSFET.

23. A switching circuit, comprising:
means for alternately switching on a first switch and a second switch,
wherein a capacitor and a first capacitive element form a first capacitive voltage divider coupled between a first supply node and a second supply node when the first switch has been switched off and the second switch has been switched on,
wherein the capacitor and a second capacitive element form a second capacitive voltage divider coupled between the first supply node and the second supply node when the first switch has been switched on and the second switch has been switched off,
wherein a power source is coupled between the first supply node and the second supply node, and
wherein the means for alternately switching on the first switch and the second switch pre-charges the capacitor to reduce an inrush current; and
means for detecting a voltage level of a voltage across the capacitor and means for switching on the first switch and the second switch when the voltage level has reached a predefined level.

24. The method of claim 1, further comprising:
charging the first capacitive element via the second switch when the first switch has been switched off and the second switch has been switched on; and
charging the second capacitive element via the first switch when the second switch has been switched off and the first switch has been switched on.

25. The switching circuit of claim 23,
wherein the first capacitive element is configured to be charged via the second switch when the first switch has been switched off and the second switch has been switched on; and
wherein the second capacitive element is configured to be charged via the first switch when the second switch has been switched off and the first switch has been switched on.

* * * * *